Feb. 25, 1964   G. PFEIFER   3,122,161
RESIDUAL PRESSURE CHECK VALVE
Filed Oct. 31, 1960

INVENTOR.
GUNTHER PFEIFER
BY
William P. Hickey
ATTORNEY 3,122,161
RESIDUAL PRESSURE CHECK VALVE
Gunther Pfeifer, South Bend, Ind., assignor to The Bendix Corporation, South Bend, Ind., a corporation of Delaware
Filed Oct. 31, 1960, Ser. No. 66,227
2 Claims. (Cl. 137—493.2)

The present invention relates to inexpensive two-way check valve structures; and more particularly to a new and improved and less expensive residual pressure check valve structure for master cylinders and the like.

An object of the present invention is the provision of a new and improved master cylinder arrangement wherein the residual pressure check valve structure is seated directly against the tubing ferrule which is used to attach the hydraulic brake line to the master cylinder.

Another object of the present invention is the provision of a new and improved two-way check valve structure of large flow capacity so that it can be placed directly against a tubing ferrule of small diameter.

A still further object of the present invention is the provision of a new and improved valve poppet having a slit therethrough which permits fluid flow in one direction through the slit, and which poppet is a self-supporting structure forming an arch; so that return fluid pressure in the opposite direction closes the slit and thereafter produces compression in the elastomeric material which resists the force of the fluid.

The invention resides in certain constructions and combinations and arrangements of parts; and further objects and advantages of the invention will become apparent to those skilled in the art to which the invention relates from the following description of the preferred embodiments described with reference to the accompanying drawings forming a part of this specification, and in which.

Figure 1:
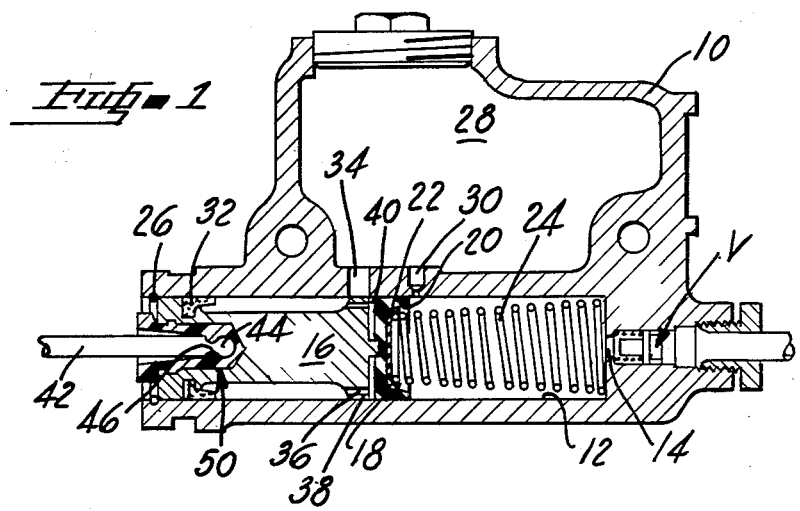
FIGURE 1 is a cross-sectional view of a master cylinder embodying principles of the present invention.

The master cylinder shown in FIGURE 1 generally comprises a housing 10 having a longitudinally extending fluid pressurizing bore or chamber 12 therein from which fluid is forced out of its outlet 14 by means of a conventional spool shaped hydraulic piston 16. A conventional cup shaped seal 18 is positioned against the inner end of the piston 16 with its lips 20 sealingly engaging the sidewalls of the bore 12 to thereby provide the unit's high pressure seal. Cup shaped seal 18 is held in position against the piston 16 by means of a washer 22 and piston return spring 24; and outward movement of the piston 16 is limited by means of a snap ring 26 that is positioned in a suitable groove in the sidewalls of the bore 12 adjacent its outer end.

The master cylinder shown in the drawing is intended to operate the hydraulic braking system of an automotive vehicle; and in order to compensate for changes in volume in, or leakage from, the braking system, a reservoir of compensating fluid 28 is provided in the housing 10 in the region overlying the fluid pressurizing bore 12. A compensating port 30 connects the reservoir 28 with the bore 12 just forwardly, or inwardly, of the normal or retracted position of the lip of the seal 18 when the piston 16 is in abutment with the snap ring 26; and upon forward movement of the piston 16, the lips 20 of the seal 18 slide over the compensating port 30 to thereafter isolate the reservoir from the chamber 12 and force fluid out through the outlet 14. An annular seal 32 is positioned adjacent the rear flange of the piston 16 to prevent loss of fluid out of the bore 12; and a passage 34 in the housing 10 communicates the reservoir 28 with the portion of the bore 12 that is always positioned between the seals 18 and 32. In order that a pumping action can be had when the seal 18 is inwardly of the compensating port 30, a plurality of openings 36 are provided through front flange 38 of the piston 16. Fast rearward movement of the piston 16, as caused by quick release of the brake pedal of the vehicle, permits the piston return spring 24 to move the seal 18 rearwardly faster than fluid enters through the port 14—to thereby produce a pressure in the inner end of the bore 12 which is less than that in the reservoir 28. This reduction in pressure permits the lips 20 of the seal to be moved inwardly away from the sidewalls of the bore 12, to thereby allow flow of fluid through the openings 36 and around the periphery of the seal to the inner portion of the bore 12. If the piston 16 is again moved forwardly without moving the lips 20 rearwardly of the compensating port 30, the additional fluid which had previously passed around the outer periphery of the seal 18 will then be forced out through the outlet 14 into the braking system. In order that hydraulic pressure will not extrude the seal 18 through the openings 36, a thin metallic member 40 of approximately 6 thousandths of an inch thick is positioned between the seal 18 and the inner end of the piston 16 over the openings 36. The metallic member 40 has a plurality of fingers individual ones of which overlie individual ones of the openings 36, and the member 40 is held in place at its center by a suitable riveting structure.

The piston 16 is of course actuated by means of the usual push rod 42, which is suitably pivoted to the brake pedal lever not shown, and which is provided with the usual ball shaped end 44. The push rod has a narrow neck portion 46 between the ball shaped end and main portion of the rod 42 to permit suitable structure 50 to engage the rear surface of the ball shaped end and hold it in place.

In the prior art master cylinders there has usually been provided a back pressure valve on the outlet of the master cylinder which limits the rate of return fluid through its outlet port, so that inertia of the returning fluid does not produce a vacuum in the wheel cylinders of the actuated brake system to thereby draw air past the cup seals of the wheel cylinders. The prior art back pressure valves, or residual pressure check valves as they are sometimes called, with which I am familiar, have been of quite large diameter and have been seated in the inner end of the fluid pressurizing chamber 12. These residual pressure check valve structures have been seated against a shoulder in the inner end of the bore 12; and it has been necessary to accurately machine this shoulder so that a suitable fluid seal will be provided.

The hydraulic tubing which is used to connect master cylinders to the wheel cylinders in automotive vehicles are generally of small diameter, usually in the neighborhood of approximately one quarter of an inch. According to principles of the present invention, it is an object to provide a residual pressure check valve of large enough flow capacity, so that it can be placed in the usual connection for attaching the tubing to the master cylinder without the machining of a separate valve seat in the housing 10 of the master cylinder. In the embodiment shown in FIGURES 1 and 2 of the drawings, the residual pressure check valve structure V is positioned in the outlet port 14 and is biased against the inner end of tubing ferrule 60. The outlet port 14 is drilled as at 62, and then counterbored as at 64, to provide a shoulder 66 against which the tubing ferrule 60 is seated. The hydraulic tubing 68 is flared as at 70, and the flared end is sealingly clamped against the end of the ferrule 60 by means of the usual threaded tubing nut 72 which effects both a seal between the tubing and ferrule, and between the ferrule and shoulder 66.

The poppet member of the residual pressure check valve V is a generally dome shaped structure made of an elastomeric material, such as synthetic rubber, which is biased up against the inner end of the ferrule 60. The ferrule 60 has a seat 76 on its inner end for the poppet member 74 which seat is preferably machined at an angle. The poppet member is biased into engagement with the seat 76 by means of a coil spring 78.

According to further principles of the present invention the poppet member 74 is preferably made as a dome shaped structure; so that pressure forces on the external surface of the poppet member produce compression in the dome shaped or arched portion of the poppet member—which compression is transmitted to a stiffened outer peripheral portion 80 of the poppet member. The center of the dome is provided with at least one slit 82, as with a knife, so that pressure flow out through the outlet port separates the sides of the slit and bends the dome 84 outwardly to permit fluid flow therethrough. When the pressure in the fluid pressurizing chamber 12 is reduced below that in the lines leading to the wheel cylinders pressure, the fluid pressure upon the external surface of the dome 84 produces compression within the dome thereby causing the sidewalls of the slit to be squeezed together. Inasmuch as the poppet member 74 is made generally dome shaped, outward force upon the dome is free to bend it backwardly, while inward force upon the poppet member produces compression within the dome which is transmitted to its stiffened outer periphery 80. It will therefore be seen that the dome 84 is stiffer when resisting inward flow, than when it is subjected to outward flow; and the dome 84 is preferably made of such a thickness that it will not be bent inwardly by any appreciable amount before the force of the spring 78 is overcome and the poppet member 74 is moved inwardly away from its seat 76. The outer periphery 80 of the poppet member may be stiffened in any suitable manner, as by a considerably increased thickness of the elastomeric material, and will preferably include external ridges which guide the structure relative to the sidewalls of the bore 62. As shown in the drawing however, it is stiffened by means of a generally tubular structure 86 having a groove in its outer periphery into which a radially inwardly extending flange 88 of the poppet member 74 is snapped to retain the poppet in position. Transverse openings 90 are provided through the inner end of the tubular structure 76, so that inward flow around the poppet member will not be cut off should the tubular member 86 abut against the inner end of the bore 62.

Figure 2:
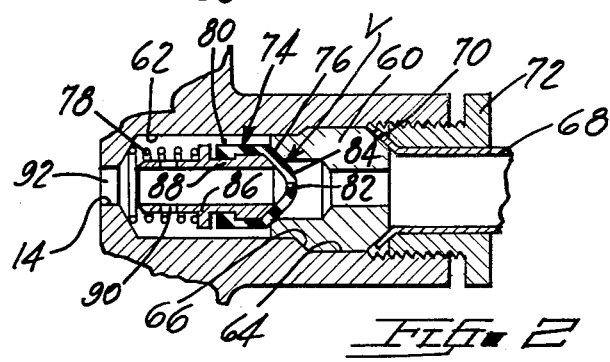
FIGURE 2 is a fragmentary cross-sectional view of the residual pressure check valve structure shown in FIGURE 1.

In the embodiment shown in FIGURES 1 and 2, movement of the piston 16 inwardly of the position shown in the drawing closes off the compensating port 30; and thereafter forces fluid out through the port 14, through the central opening 92 of the tubular structure 86 to bend the portions of the dome 84 lying on opposite sides of the slit 82 outwardly. It will be seen that the dome 84 is free to bend outwardly sufficiently to provide a flow opening generally equaling that of the opening 92 through the stiffening structure 86. When force upon the piston 16 is relaxed, pressure from the wheel cylinders causes the dome 84 to be compressed, thereby causing the sides of the slit 82 to close off flow therethrough. The pressure of the returning fluid produces a compression of the rubber material in the dome 84 which prevents the dome 84 from being bent inwardly to any appreciable extent. The force of the fluid biases the poppet member 74 away from the seat 76 to flow around the outer periphery of the poppet member and then pass either around the inner end of the tubular structure 86 or through its holes 90 to the outlet port 14.

Figure 3:
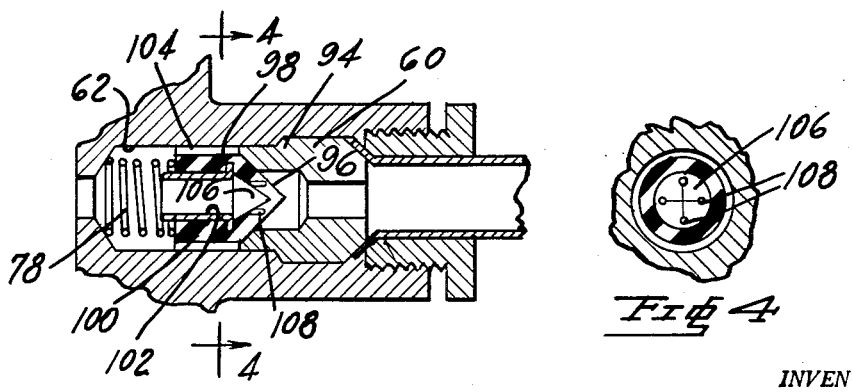
FIGURE 3 is a fragmentary cross-sectional view similar to FIGURE 2 but showing another embodiment of the invention.
Figure 4:
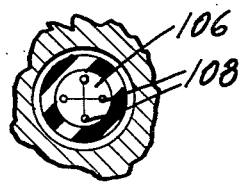
FIGURE 4 is a fragmentary cross-sectional view taken approximately on the line 4—4 of FIGURE 3.

The embodiment shown in FIGURE 3 functions generally in the same manner as the embodiment previously described, and differs principally in the type of stiffening structure which is used for the poppet member. The poppet member 94 is generally conically shaped with the wall thickness of its dome 96 increasing as it approaches its outer periphery; and the outer periphery 98 is generally thickened and snapped over tubular member 100. The tubular member 100 has a short axially inwardly extending flange 102 about which the end of the biasing spring 78 is positioned to retain the spring in place. The outer periphery of the poppet member 94 is provided with longitudinally extending projections 104 which are formed integrally of the elastomeric material to center the poppet member within the bore 62. With some types of elastomeric material, the slot 106 may grow in length during use due to tearing of the elastomeric material; and in order to prevent this, depressions 108 may be performed or molded into the poppet member 94. The depressions 108 will preferably extend most of the way through, but not completely through, the dome 96, and the slot 106 will initially be made between a pair of these depressions positioned on opposite sides of the dome 96. In still further instances it will be desirable to provide more than one slot 106; and as shown in FIGURES 3 and 4, two slots 106 are provided extending at right angles to each other, with the sides of each slot terminating in one of the holes 108.

While the invention has been described in considerable detail, I do not wish to be limited to the particular constructions shown and described; and it is my intention to cover hereby all novel adaptations, modifications and arrangements thereof which come within the practice of those skilled in the art to which the invention relates.

I claim:

1. In a fluid pressurizing device: adapted to be connected to a tubular conduit; a housing having a fluid pressure chamber with an outlet port therefrom communicating with the outside surface of said housing, means for producing two directional flow through said outlet port, said outlet port being counterbored from its external surface to form a first shoulder facing outwardly of said port, a ferrule in said counterbore seated against said first shoulder, a tubular conduit seated against the outer annular surface of said ferrule, a generally tubular member having an annular end surface spaced inwardly of and biased for movement toward the inner annular surface of said ferrule, a generally dome shaped poppet member made from an elastomeric compound secured over said annular end of said tubular member to be sealed between said tubular member and said inner annular face of said ferrule and with its center portion adapted to project into the central opening of said ferrule, said poppet member having a slot therethrough which opens to allow flow out through said poppet and being rigid enough that force on the outer surface of said dome shaped poppet member is transmitted by compression to said tubular member, and means guiding and biasing said tubular member toward said ferrule.

2. In a fluid pressurizing device: adapted to be connected to a tubular conduit; a housing having a fluid pressure chamber with an outlet port therefrom communicating with the outside surface of said housing, means for producing two directional flow through said outlet port, said outlet port being counterbored from its external surface to form a first shoulder facing outwardly of said port, a ferrule in said counterbore seated against said first shoulder, a tubular conduit seated against the outer annular surface of said ferrule, and a two way check valve structure biased against the inner annular surface of said ferrule, said two way check valve structure moving away from said ferrule to permit return flow to pass between said ferrule and check valve structure, said valve structure providing another passage which permits flow out through said structure but prevents return flow therethrough.

References Cited in the file of this patent

UNITED STATES PATENTS

| | | |
|---|---|---|
| 2,085,360 | Harnmett | June 29, 1937 |
| 2,407,957 | Hull-Ryde | Sept. 17, 1946 |
| 2,431,457 | Bondurant | Nov. 25, 1947 |
| 2,642,259 | Catlin | June 16, 1953 |
| 2,789,578 | Goepfrich | Apr. 23, 1957 |